United States Patent [19]
Smith et al.

[11] 3,809,184
[45] May 7, 1974

[54] METERING VALVE AND LUBRICATING SYSTEM PROVIDED THEREWITH

[75] Inventors: Roy B. Smith, Washington Court House; Alex T. Sabo, Cuyahoga Falls; Edward M. Kavick, Chardon, all of Ohio

[73] Assignee: Samuel Moore & Company, Mantua, Ohio

[22] Filed: Mar. 23, 1973

[21] Appl. No.: 344,211

[52] U.S. Cl. .............................. 184/7 D, 222/335
[51] Int. Cl. ............................................ F16n 25/02
[58] Field of Search .......... 184/7 R, 7 D, 7 E, 55 A; 222/335

[56] References Cited
UNITED STATES PATENTS

| | | | |
|---|---|---|---|
| 3,209,956 | 10/1965 | McKenzie | 222/335 |
| 3,715,013 | 2/1973 | Lyth et al. | 184/7 E X |
| 3,587,782 | 6/1971 | Russell | 184/7 D |
| 2,905,270 | 9/1959 | Jackson | 184/7 E |
| 3,581,845 | 6/1971 | Nederynen | 184/7 D |

*Primary Examiner*—Manual A. Antonakas
*Attorney, Agent, or Firm*—Clelle W. Upchurch

[57] ABSTRACT

A metering valve and a modular valve assembly for a lubricating system for vehicles or the like are provided. The metering valve has a casing, a valve body with an axial bore therethrough disposed in the casing, a piston slidably disposed in the bore and carrying means for alternately sealing the bore upstream and downstream of a port leading to a chamber for measuring lubricant, means for applying to and withdrawing pressure from the piston, means for charging lubricant through the bore into the chamber when the sealing means is downstream of the port, and means for discharging the lubricant from the chamber in the absence of pump pressure. The casing may be the wall of a bore in a metal block which contains a plurality of bores and valve bodies to provide a unitary assembly of metering valves.

10 Claims, 6 Drawing Figures

LUBRICANT IN

METERING VALVE AND LUBRICATING SYSTEM PROVIDED THEREWITH

This invention relates generally to lubricating devices and more particularly to a metering or measuring valve for use in lubricating the bearings of a vehicle such as a tractor-trailer or for lubricating any other apparatus which requires automatic controlled lubrication.

It has been proposed heretofore to provide vehicles and other mechanical apparatus with automatic lubricating devices. One such device is disclosed, for example, in U.S. Pat. No. 3,659,675. The disclosed apparatus has a piston pump which withdraws lubricant from a reservoir and discharges it under pressure into a conduit leading to a bearing which requires lubrication. The pump may be actuated manually or by a suitable timer set to actuate a valve which permits air under pressure to enter the pump at predetermined intervals. Such systems require a metering valve which regulates the flow of lubricant into the bearing. A metering valve is usually located near each fitting serving a bearing. Maintenance of metering valves spread about in various locations on the machine is often difficult because of the positioning of the valve. Moreover, many of the heretofore available assemblies, cannot be adjusted or repaired without disturbing the plumbing with admission of air into the system.

It is therefore an object of this invention to provide a lubricating system which is easily accessible and easy to maintain in working order. Another object of the invention is to provide a lubricating system for periodically lubricating the bearings of a vehicle or other machine having the metering valves centrally located on the machine in a convenient, accessible location. Still another object of the invention is to provide an improved metering valve for an automatic lubricating system. A still further object of the invention is to provide a metering valve of simple construction which repeatedly measures accurate volumes of lubricant discharged therefrom.

Other objects will become apparent from the following description with reference to the accompanying drawing wherein FIG. 1 illustrates in side elevation one embodiment of a lubricating system provided by the invention;

FIG. 4 is an enlarged fragmentary section showing a means for joining together blocks which house metering valves in accordance with the invention;

FIG. 6 is a fragmentary sectional view similar to FIG. 2, showing the output of the metering valves confined to one side port by the insertion of plugs in the other outlet ports.

The objects of the invention are accomplished, generally speaking, by providing a metering valve having a casing, a valve body in the casing having an axial bore therethrough, a piston slidably disposed in the bore, a port in said body communicating between the said bore and an annular space of predetermined volume between the body and the surrounding wall of the casing, a cup-shaped member slidably disposed about the end of the body and defining one end of said annular space, resilient means for urging said member towards said port in the absence of positive pressure in the bore, means carried by the piston for sealing the opposite end of the annular space, means carried by one end of the piston for sealing the bore against fluid flow, means for introducing lubricant under pressure into the bore and thereby slide the sealing means downstream of the port, and means for biasing the piston until the sealing means is upstream of the port when the axial bore is not under positive pressure.

Figure 1:
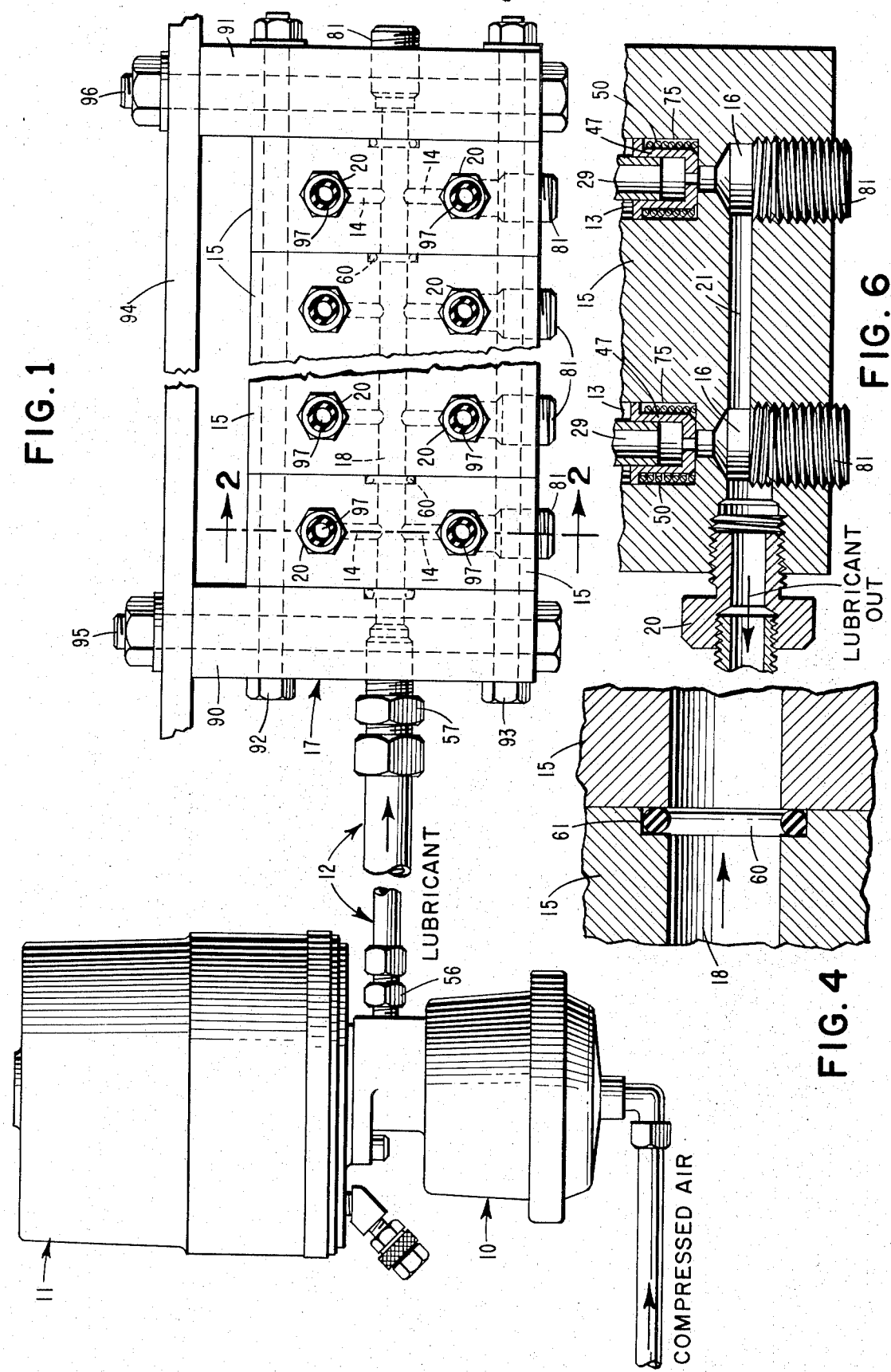

Referring now to the drawing, a pump 10 having a piston actuatable by compressed air or other means and adapted to withdraw lubricant from reservoir 11 and to force it under pressure through conduit 12 is illustrated in FIG. 1. Pump 10 and reservoir 11 may be the ones disclosed in U.S. Pat. No. 3,659,675. Conduit 12 extends between pump 10 and a metal block assembly 17 having a bore 18 extending longitudinally therethrough. Suitable fittings 56 and 57 form a fluid-tight seal between conduit 12 at one end to pump 10 and at the other end to bore 18 of block assembly 17.

Block assembly 17, as illustrated in FIG. 1, is composed of end caps 90 and 91 and a plurality of metal blocks 15 each having a longitudinal bore therethrough aligned with a similar bore of the adjacent blocks to form bore 18. As illustrated in FIG. 4, an O-ring 60 disposed in a recess 61 in one of the adjoining blocks 15 provides a fluid impervious seal where two longitudinal bores join to form bore 18. A single block 15 and end caps 90 and 91 may form an assembly 17. Plug 81 closes the end of bore 18.

The plurality of blocks 15 are held together to form block assembly 17 by end caps 90 and 91 and bolts 92 and 93. The block assembly 17 is fastened to a vehicle frame 94 or other supporting structure by bolts 95 and 96.

A bore 13 is drilled substantially perpendicularly in each block 15 on each side of bore 18 and spaced transversely therefrom. A passageway 14 communicates between bore 18 and bore 13. A valve body 24 is disposed in each bore 13 to combine with the wall of bore 13 to form a metering valve.

Each bore 13 is connected through a counterbore 16 by a suitable fitting 20 to a flexible conduit 97 which leads to a bearing of a vehicle which requires lubrication. A plurality of the metering valves may be mounted in one block 17 in any easily accessible position to provide a modular construction. As illustrated in FIG. 6, if the lubricant discharged from two valves is to be delivered to the same bearing, a passageway 21 may be drilled between two counterbores 16. A suitable plug 81 may then be substituted for fitting 20 in any two of the counterbores 16 so that the supply of lubricant from two valves passes into only one conduit leading to a bearing as shown in FIG. 6.

Figure 2:
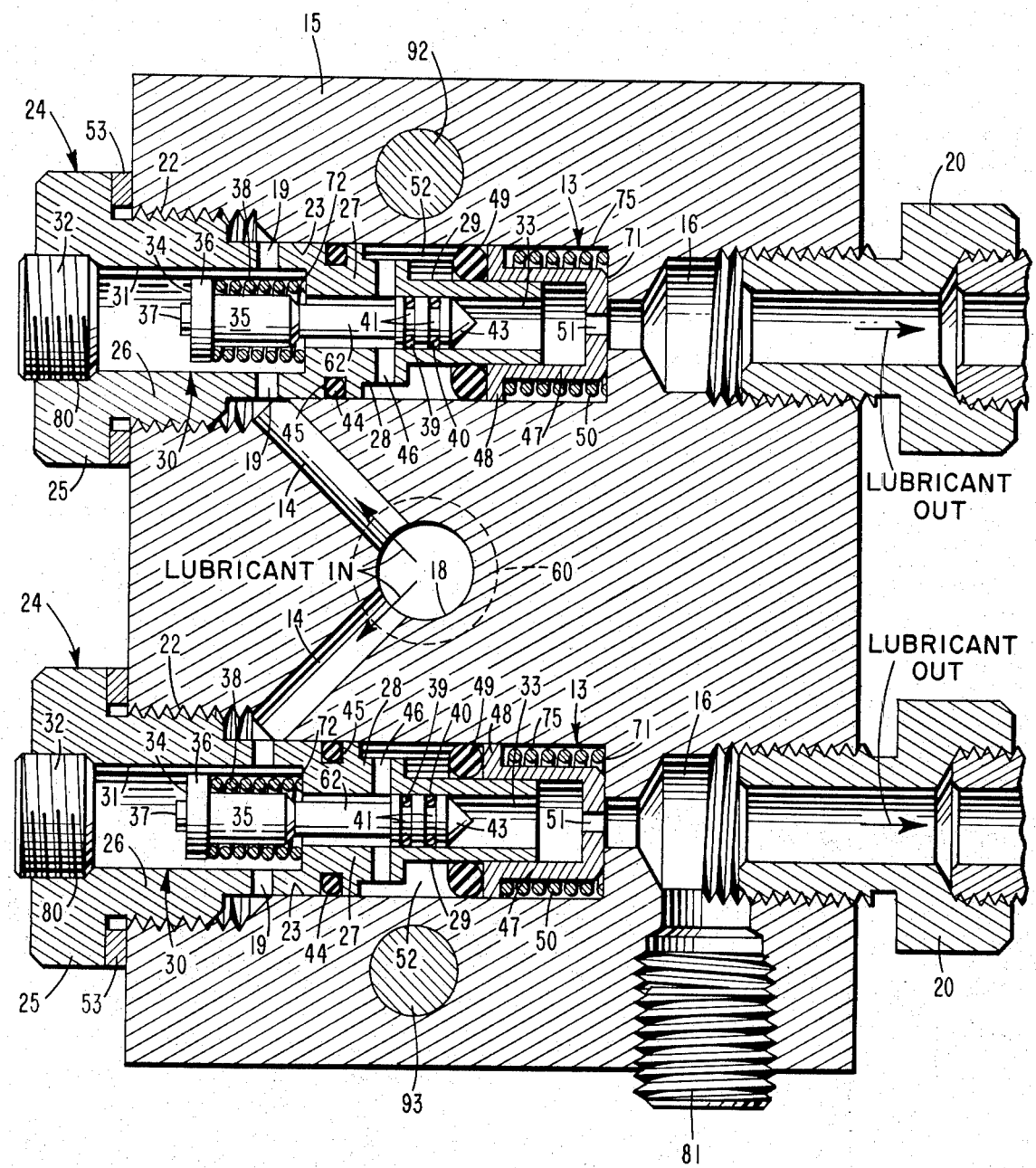
FIG. 2 is a section taken along the line 2—2 of FIG. 1 showing the metering valves under pressure.
Figure 3:
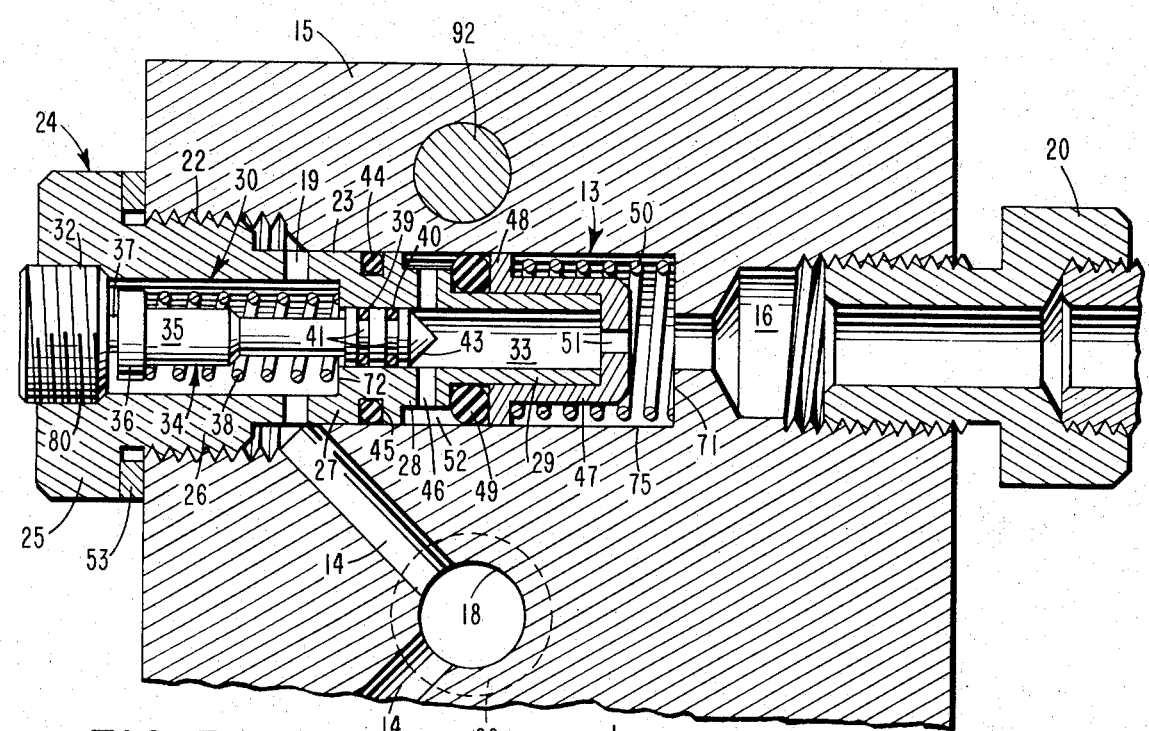
FIG. 3 is a fragmentary section similar to FIG. 2 but showing the valve as it appears when the pump is not exerting pressure on the lubricating system.

The wall of cylindrical bore 13 in block 15 is the casing for the valve in the embodiments illustrated in FIGS. 1 through 3. Each bore 13 is divided into a first bore section 22 adjacent to the open end at the surface of block 15 and a second bore section 23 of smaller diameter than section 22. The wall of the first bore section 22 is threaded and passageway 14 enters bore 13 obliquely at the point where sections 22 and 23 meet. Valve body 24 disposed in bore 13 has an annular flange 25 at its exposed end, a threaded first cylindrical portion 26 threadably secured in threaded bore section 22, a second cylindrical portion 27 having a smaller diameter than cylindrical portion 26 and forming a slide fit in section 23 of bore 13, a third cylindrical portion 28 of smaller diameter than cylindrical portion 27, and an integral cylindrical end portion 29 of smaller diameter than cylindrical portion 28 extending therefrom. An axial bore 30 extends through valve body 24. Axial bore 30 is divided into a first axial bore section 80 at its upstream end, a second, intermediate axial bore section 31 of smaller diameter than section 80 and an elongated third axial bore section 33 of smaller diameter than axial bore section 31. Plug 32 forms a fluidtight seal in the first section 80. A port 19 drilled through cylindrical portion 27 provides for lubricant to pass from passageway 14 into bore section 31.

A piston 34 having a body portion 35 with an annular flange 36 about the upstream end thereof and an upstanding boss 37 adjacent to plug 32 is disposed in bore 30. A spring 38 about piston body 35 is compressed between flange 36 and the base 72 of bore section 31 formed by the juncture of sections 31 and 33. Spring 38 urges piston 34 in the absence of pump pressure into the position illustrated in FIG. 3 with boss 37 against plug 32. A pair of O-rings 39 and 40 are disposed in grooves 41 in piston 34 to form a fluid tight seal between the downstream end 43 of piston 34 and the surrounding inner wall of cylindrical end 29 of valve body 24. An O-ring 44 is disposed in an annular groove 45 in second cylindrical portion 27 of valve body 24 to form a fluid tight seal with the surrounding wall of bore 13.

The outer diameter of cylindrical end 29 is less than the diameter of bore 13. The resulting annular space about member 29 joins with the annular space between cylindrical portion 28 and the wall of bore 13 to form a measuring chamber 52 for lubricant to be discharged from the valve. A port 46 is drilled through shoulder 28 to provide for movement of lubricant from bore 30 into chamber 52. The length of piston 34 is such that O-rings 39 and 40 are downstream of port 46 when lubricant in bore 30 is under positive pressure and are upstream of port 46 when the upstream end of piston 34 is disposed against plug 32. Those portions of piston 34 upstream of O-ring 39 are slightly smaller in diameter than bore 30 so lubricant can pass through bore 30.

A cup-shaped member 47 fits loosely about the cylindrical end 29 of piston 34. The outside diameter of member 47 is smaller than the diameter of bore 13. An annular flange 48 about the open end of cup-shaped member 47 forms a loose fit with the wall of bore 13. An O-ring 49 is disposed upstream of flange 48 and about cylindrical portion 29. A spring 50 about member 47 is compressed between flange 48 and the base 71 of bore 13. A passageway 51 is drilled through the base of member 47 to provide for lubricant flow from chamber 52 to chamber 75. Spring 50 urges member 47 into the position illustrated in FIG. 3 when the piston 34 is not under positive pressure from pump 10. The movement of member 47 away from base 71 is stopped when cup 47 strikes the end of cylindrical portion 29 of valve body 24.

Chamber 52 has its maximum volume, as illustrated in FIG. 2, when there is pump pressure on the piston 34 and member 47 is disposed against base 71. As shown in FIG. 2, chamber 52 is closed at one end by O-ring 49 and at the other end by O-ring 44 carried by cylindrical portion 27.

A spacer ring 53 is disposed between flange 25 and the underlying surface of block 15. The thickness of ring 53 or the number thereof may be varied to vary the depth of penetration into bore 13 by valve body 24 and thereby vary the volume of chamber 52 when cup-shaped member 47 is in the position illustrated in FIG. 2.

Figure 5:
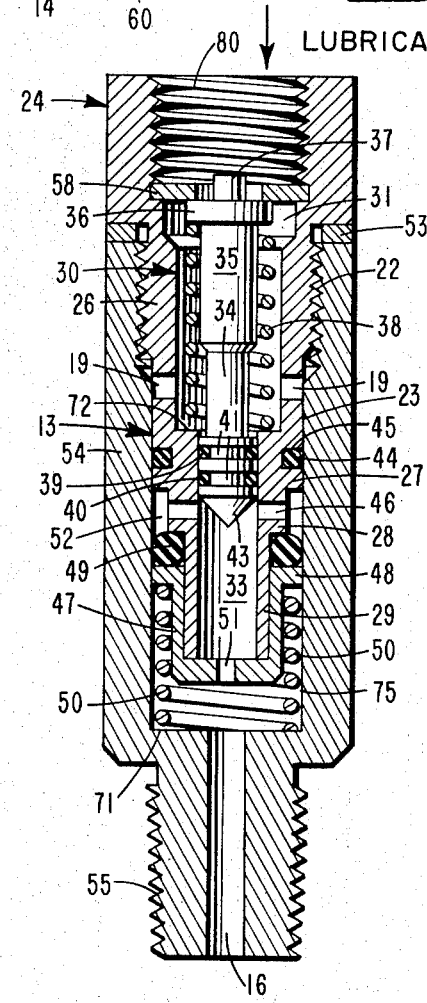
FIG. 5 illustrates a second embodiment of the metering valve provided by the invention.

An embodiment of a metering valve adapted to be used alone or as a single valve not housed in a block 15 is illustrated in FIG. 5. A tubular casing 54 having a bore 13 is substituted for block 15. The valve body 24 has an axial bore 30 and is similar to valve body 24 illustrated in FIGS. 2 and 3. Valve body 24 is threadably secured in first bore section 22 of casing 54. Casing 54 has an integral threaded tubular male fitting 55 at its downstream end for attaching it to a conduit leading to a bearing to be lubricated. Port 19 would not have any function in the embodiment having a casing 54.

In the embodiment shown in FIG. 5, a ring 58 is disposed in axial bore 30 to stop piston 34 as it is biased upwardly by spring 38. A suitable male fitting secured to an end of a conduit 12 (not shown) is substituted for plug 32 in the threaded end 80 of axial bore 30 for the introduction of lubricant into bore section 31. The valve body 24 is the same as the one illustrated in FIGS. 2 and 3 with the exception that port 19 is not used. The configuration of bore 13 about valve body 24 is also identical to bore 13 in block 15.

In operation of the lubricating device illustrated in FIGS. 1 through 4, a supply of lubricant is provided in reservoir 11, pump 10 is mounted in a convenient place on a vehicle or other mechanical device and connected through conduit 12 to bore 18. Means such as a manually actuated or timer actuated valve is provided for periodically actuating pump 10 with compressed air. On the positive stroke of the pump, lubricant is forced through conduit 12, bore 18 and bore 14 through port 19 into bore section 31. Lubricant will move around piston 3 and between flange 36 and plug 32 to move piston 34 from the position illustrated in FIG. 3 to that illustrated in FIG. 2. With piston 34 positioned in bore 13 as shown in FIG. 2, O-rings 39 and 40 form a fluid impervious seal with the innerwall of cylindrical member 29 downstream of port 46. Continued flow of lubricant into bore section 31 forces lubricant around the elongated portion 62 of piston 34. Lubricant cannot pass O-rings 39 and 40 so it flows through port 46 into measuring chamber 52. As pointed out above, the volume of chamber 52 has been predetermined by selection of the relative diameters of bore 13 and cylindrical portions 28 and 29 and by the thickness of spacer ring 53. As lubricant fills chamber 52, pressure is exerted against O-ring 49 and member 47 is forced to the end of bore 13 as illustrated in FIG. 2. Lubricant stored in bore 75 in the space between the base of member 47 and base 71 of bore 13 from a previous cycle is forced by cup-shaped member 47 through counterbore 16 and lubricant equal in volume to that discharged from chamber 52 will be forced into the bearing to be lubricated.

On the backstroke of pump 10, spring 38 moves piston 34 back into the position shown in FIG. 3. O-rings 39 and 40 carried on piston 34 now form a fluid impervious seal with the wall of axial bore 33 upstream of port 46. Spring 50 urges cup-shaped member 47 away from the base of bore 13 until further movement is stopped by cup 47 striking the end of cylindrical portion 29. As member 47 moves towards cylindrical portion 29, it forces lubricant from chamber 52 through port 46. Since the lubricant cannot move around O-rings 39 and 40, it flows through port 51 of cup-shaped member 47 into the space 75 between its base and the base 71 of bore 13. Then, upon the next stroke of pump 10, the lubricant in the space 75 between member 47 and the base of bore 13 is forced through counterbore 16 as described above. Piston 34 must oppose from about 200 to 300 or more p.s.i. residual pressure in the lubricant line when it moves upstream from the position illustrated in FIG. 2 to the position shown in FIG. 5. In order to minimize the quantity of lubricant pushed back by the piston 34, the diameter of the flanged end 36 is made as small as possible and the length of travel of piston 34 is as short as possible. For example, in one embodiment, the diameter of the flanged end 36 of piston 34 is one-fourth inch and the distance piston 34 travels from its upstream to downstream position is one-eighth inch.

The valve of FIG. 5 operates in the same way as those illustrated in FIG. 2 except that lubricant is introduced into bore sections 31 through the open end of axial bore 30 instead of through a port 19.

Block 15 may be any suitable metal or plastic such as aluminum, magnesium, steel, polycarbonate, nylon or the like.

The metering valves provided by the invention can be replaced easily and quickly in the field without disturbing existing plumbing and subsequent admission of air into the system. With the exception of spacers 53, all component parts are common to all meters so parts inventory is low and allows the customer to stock one type of meter for spare parts together with various spacers.

Although the invention has been described in detail for the purpose of illustration, it is to be understood that such detail is solely for that purpose and that variations can be made therein by those skilled in the art without departing from the spirit and scope of the invention except as it may be limited by the claims.

The embodiments of the invention in which an exclusive property or privilege is claimed are defined as follows:

1. A valve adapted to discharge a metered amount of a lubricant comprising a casing, a valve body in the casing having an axial bore therethrough, a piston slidably disposed in the bore, a part in said body communicating be-tween the said bore and an annular space about the body, a member slidably disposed about the end of the body to close one end of said annular space, means for urging said member towards said port in the absence of positive pressure on the port, means carried by the piston for sealing the opposite end of the said space, means carried by the piston for sealing the bore while downstream of the port, means for introducing lubricant under pressure into the bore and thereby slide the piston downstream of the port, and means for biasing the piston to a position upstream of the port in the absence of positive pressure in the axial bore.

2. The valve of claim 1 wherein the casing is a block having a plurality of bores therein with each bore housing a valve body.

3. The valve of claim 1 wherein the said means for introducing lubricant under pressure is a port in the valve body which communicates with a bore in the block and said bore is attached through a conduit to a pump.

4. The valve of claim 1 wherein the piston carries a flange disposed outwardly from the valves casing and a spacer ring is disposed about the valve body and between the casing and flange to determine the depth of the valve body in the casing and the volume of said annular space.

5. The valve of claim 1 having a flanged upstream end and a fitting for receiving lubricant from a source thereof under pressure through said end.

6. A lubricating system comprising a lubricant pump and a block having a first passageway therein connected to receive lubricant flowing from the pump, a plurality of bores spaced along said passageway with their longitudinal axis substantially perpendicular to the longitudinal axis of the said passageway, a metering valve body in each bore having an axial bore therethrough, a piston slidably disposed in the bore, a port in said body communicating between the said bore and an annular space about the body, a member slidably disposed about the end of the body to close one end of said annular space, means for urging said member towards said port in the absence of positive pressure on the port, means carried by the piston for sealing the opposite end of the said space, means carried by the piston for sealing the bore against lubricant flow, means for introducing lubricant under pressure into the bore and thereby slide the piston downstream of the port, and means for biasing the piston to a position upstream of the port in the absence of pressure.

7. The system of claim 6 wherein at least two of the valves are connected to a common passageway and combine to discharge lubricant into a bearing.

8. A valve for metering a lubricant comprising a tubular casing having a bore therein, a base and an open end, a counterbore through said base, said casing having a first bore section adjacent its open end and a second bore section of smaller diameter than the first bore section, a valve body disposed in said bore having an end external of the open end of the casing, an axial bore through said valve body, said axial bore having a first axial bore section at its open end threaded for connection to a source of lubricant under pressure, a second axial bore section of smaller diameter than the first axial bore section and a third axial bore section of smaller diameter than the second axial bore section, said valve body having a first cylindrical portion threadably disposed in said first bore section of the casing, a second cylindrical portion integral with and of smaller diameter than the first cylindrical portion disposed in the upstream end of the second bore section of the casing in a fluid seal relationship therewith, a third cylindrical portion of smaller diameter than the second cylindrical portion and integral therewith, a cylindrical downstream end portion of smaller diameter than the third cylindrical portion and integral therewith, a cup-shaped member having a base adjacent to the base of the casing and an annular flange about its open end, said cup-shaped member being disposed in sliding relationship about the downstream end portion of the valve body, an opening in the base of the cup-shaped member communicating with the bore of the casing, the length of the space downstream of the second cylindrical body portion being greater than the length of the cup-shaped member, resilient means for biasing said cup-shaped member upstream and about the tubular end of the valve body in the absence of positive pressure in the axial bore, means forming a seal against fluid flow between the flange of the cup-shaped member and the casing, a piston slidably disposed in the axial bore and having an annular flange about its upstream end, resilient means about the piston for biasing the piston towards the open end of the axial bore in the absence of positive lubricant pressure, means carried by the valve body for retaining the piston in the axial bore while biased towards the open end, means carried by the downstream end of the piston for forming a fluid tight seal with the said third axial bore section, a port communicating through said third cylindrical portion between the axial bore and an annular space between the casing and the third cylindrical portion and the downstream end portion of the valve body, said annular space being closed at one end by said second cylindrical portion and at the opposite end by the sealing means carried by the cup-shaped member, and means for introducing lubricant into the axial bore upstream of the piston at the pressure greater than the biasing action of the resilient means about the piston, said piston being adapted to slide under positive pressure in said axial bore to a position where said sealing means carried thereby is downstream of the said port in the third shoulder whereby lubricant will flow about said piston into said space, and said piston being adapted to slide to a position upstream of said port in the absence of positive pressure in the axial bore whereby lubricant in said space is directed downstream as it is forced from said space by said cup-shaped member as it is biased upstream by the resilient means thereabout.

9. A plurality of fluid metering valves each disposed in a different bore of a single block, said bore having a cylindrical wall, a base and an open end which form a casing for the valve, means in said base for lubricant flow from the valve to means for conducting lubricant to a bearing to be lubricated, said bore having a threaded first bore section adjacent its open end and a second bore section of smaller diameter than the first bore section, a valve body disposed in said bore having an end external of the open end of the bore, an axial bore through the valve body, said axial bore having a first axial bore section at its upstream end, a second intermediate axial bore section of smaller diameter than the first axial bore section and a third downstream axial bore section of smaller diameter than the second axial bore section, a plug in said first axial bore section forming a fluid tight seal therewith, said valve body having a first cylindrical wall portion about the second axial bore section and threadably secured to said first section of the bore in the block, a second cylindrical portion of smaller diameter than the first cylindrical portion and integral therewith, said second cylindrical portion forming a fluid tight seal with the wall of the bore in the block, a third cylindrical portion of smaller diameter than the second cylindrical portion and a cylindrical downstream end portion of smaller diameter than the third cylindrical portion, the end of said third cylindrical portion of the valve body being spaced upstream from the base of the bore in the block, a cup-shaped member having a base and an open end disposed with its open end about said cylindrical downstream end portion, an annular flange about the open end forming a slide fit with the wall of the bore in the block, the length of the cup-shaped member being less than the length of the space in the bore of the block downstream of said third cylindrical portion, means for sealing the bore in the block from fluid flow between the flange carried by the cup-shaped member and the surrounding wall of the bore in the block, means for biasing said cup-shaped member upstream until it strikes said third cylindrical portion, a port through the third cylindrical portion communicating between the axial bore and a space defined by the second, third and downstream cylindrical portions and said sealing means for the flange carried by the cup-shaped member, a piston slidably disposed in said axial bore having an upstream end having an annular flange and a downstream end forming a seal against fluid flow with said third axial bore section, that portion of the piston upstream of the said sealed end being in unsealed relationship with the axial bore whereby lubricant under pressure will flow therebetween, resilient means disposed about said piston in said first axial bore section for biasing said piston upstream until it strikes the plug in the axial bore, the length of the piston being such that the piston seals the axial bore upstream of the port through the third cylindrical portion when the piston is biased upstream by the resilient means thereabout and seals the axial bore downstream of the port when the second axial bore section is filled with lubricant under positive pressure, and means for introducing lubricant under pressure into the second axial bore section.

10. The valve and block assembly of claim 9 wherein said valve body has an annular flange about its upstream end which overlies the block and a spacer ring is disposed between the flange and the block.

* * * * *